United States Patent

[11] 3,588,560

| [72] | Inventor | Hans Akselsen<br>Chester, N.H. |
|---|---|---|
| [21] | Appl. No. | 863,117 |
| [22] | Filed | Oct. 2, 1969 |
| [45] | Patented | June 28, 1971 |
| [73] | Assignee | Honeywell Inc.<br>Minneapolis, Minn. |

[54] SHELL-TYPE MOTOR ROTATING ARMATURE
AND METHOD OF MANUFACTURE
6 Claims, 3 Drawing Figs.

[52] U.S. Cl. .................................................. 310/214,
310/45, 310/265
[51] Int. Cl. ....................................................... H02k 3/46
[50] Field of Search ........................................... 310/43, 45,
214, 262, 265, 87, 271

[56]    References Cited
UNITED STATES PATENTS

| 3,254,150 | 5/1966 | Rogers, Jr. | 310/45X |
| 3,388,458 | 6/1968 | Logan | 310/271X |

*Primary Examiner*—D. X. Sliney
*Attorneys*—Lamont B. Koontz and Philip J. Zrimsek ABSTRACT: A shell-type motor armature with two layers of glass fibers disposed about the coils thereof one layer being disposed on a bias with respect to the axis of the armature and the other layer being transverse thereto. A bonding agent associated with the coils and the layers provides a unitary rigid structure.

PATENTED JUN 28 1971 3,588,560

INVENTOR.
HANS AKSELSEN
BY Philip J. Zrinscak
ATTORNEY.

SHELL-TYPE MOTOR ROTATING ARMATURE AND METHOD OF MANUFACTURE

The present invention is directed to a rotating armature for a shell-type motor wherein the coils thereof which are in a cylindrical configuration have two layers of glass fibers disposed about a periphery thereof and the elements are formed into a unitary rigid structure by means of a bonding agent associated therewith. The invention is further directed to a method for manufacturing the above-described apparatus.

In shell-type motors of the type disclosed in the Mihalko et al. U.S. Pat. No. 3,418,505, coils of the rotating armature are encapsulated in a protective envelope including polyester resin material. Through experience it has been determined that at elevated operating temperatures (108° C.) encapsulation relying basically on the polyester resin material for rigidity and stability may not be satisfactory as distortion of the armature arises. Further, it has been determined that over a period of time the polyester resin shrinks which ultimately causes a rubbing condition to arise between the armature and the flux return member of the shell-type motor. Attempts to solve these problems by going to various polyester resin formulations has not been successful.

A completely different attack on the problem has given rise to a unique solution. Thus, instead of relying on encapsulating material to provide rigidity and stability to the armature, separate structural means have been utilized. The structural means are in the form of a pair of glass fiber layers which are disposed one over the other and about a periphery of the armature. One layer is wrapped about the periphery on a bias with respect to the longitudinal axis of the armature so as to resist torsional forces encountered while the other layer is wrapped about the periphery substantially transverse to the longitudinal axis so as to resist centrifugal forces which arise. The coils and two layers are formed into a unitary structure by a suitable bonding agent.

Because of the relative difference in weight between the envelope encapsulation construction above referred to and the glass fiber layer construction of the present invention, a further advantage is realized in lower inertia. Thus, with a shell-type motor armature as disclosed in the forementioned Mihalko et al. patent, inertia is approximately 125 percent that of a shell-type motor armature of the same configuration except for the utilization of the glass fiber layer construction of the present invention in place of the encapsulation.

It is an object therefore of the present invention to provide a shell-type motor armature with increased rigidity and stability at elevated temperatures and over time and further to provide a method of manufacturing the same.

It is a further object of the present invention to provide a rotating armature as above set forth which can withstand elevated temperature (155° C.) and the passage of time without exhibiting deterioration.

Another object of the present invention is to provide a rotating armature as above set forth which is superior to that of the prior art in terms of having lower inertia.

These and other objects will become apparent from a reading of the following specification and claims when taken in conjunction with the drawing in which:

Figure 1:
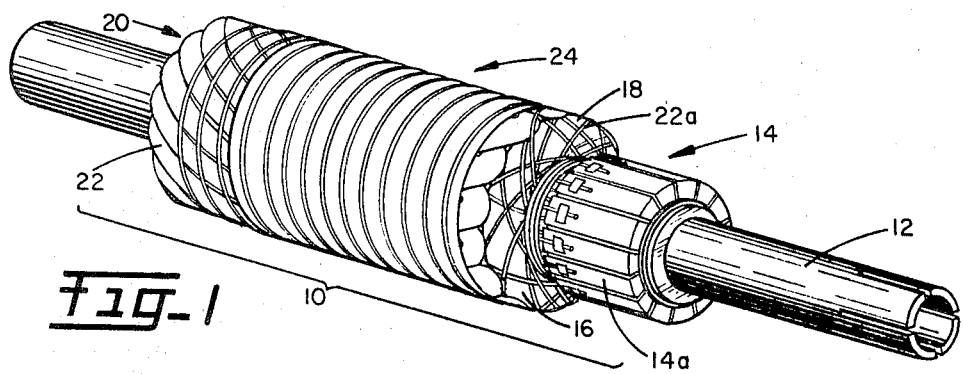
FIG. 1 is a perspective view of a rotating armature with which the invention is associated.

As shown in FIG. 1, the shell motor are armature 10 is essentially comprised of shaft 12 on which is disposed commutator 14 and collar 16 on the larger diameter 18 of which armature coil assembly 20 is supported. The armature coil assembly 20 includes a plurality of coils 22 which may be initially formed in a self-supporting cylindrical configuration in the manner disclosed in the forementioned Mihalko et al. patent and subsequently secured to the larger diameter 18 of the collar 16 by cementing or comparable fastening means.

The lead wires 22a of the coils 22 ae appropriately fastened to the proper segments 14a of the commutator 14 so as to allow for the proper electrical functioning of the armature 10 when associated with the remainder of the shell motor, not shown.

Figure 2:
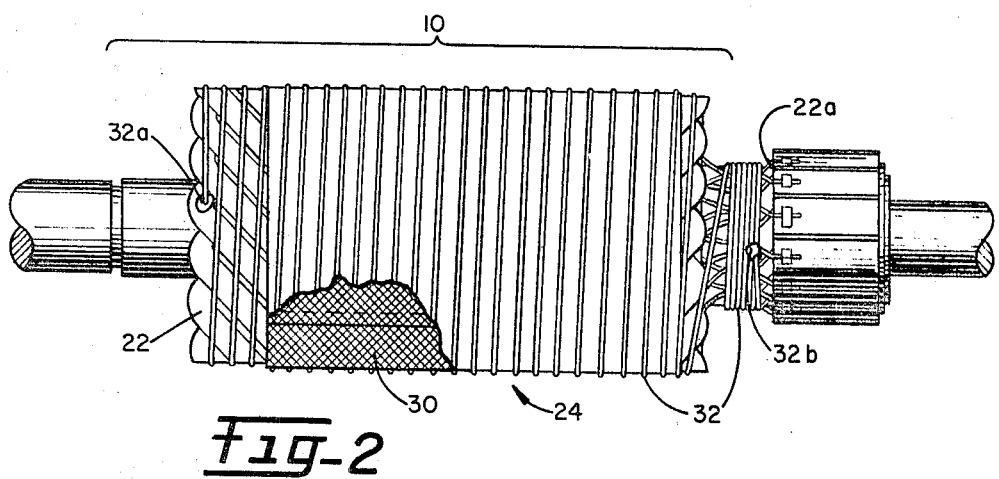
FIG. 2 is a side view partially in section of the rotating armature.
Figure 3:
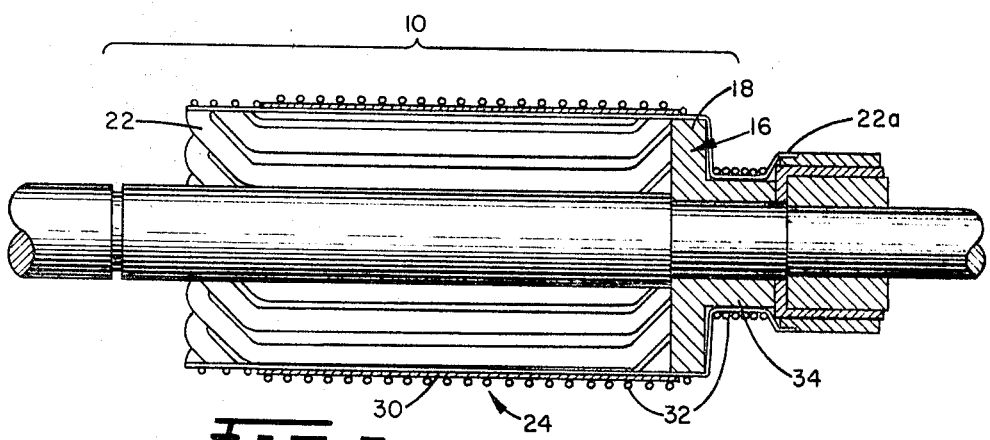
FIG. 3 is a longitudinal cross section of the rotating armature of FIG. 2.

Disposed about the outer periphery of the cylindrical configuration provided by the coils 22 of the armature 10 so as to enhance rigidity and stability thereof is reinforcing means 24 the detail construction of which can be better appreciated by referring to FIGS. 2 and 3.

Referring now to the FIGS. just mentioned, the reinforcing means 24 is shown to comprise two layers 30 and 32 of glass fiber. The inner layer 30 which may be of woven glass fiber construction is disposed about the cylindrical configuration so that the fibers thereof are located on a bias of approximately 45° to the longitudinal axis of the armature 10. The outer layer 32 which may be a glass fiber thread or yarn is wrapped about the inner layer 30 substantially transverse to the longitudinal axis of the armature 10. In practice, the glass fiber of layer 32 is so wrapped that adjacent windings are contiguous, but for purposes of illustration in the FIGS., the windings are shown spaced some distance apart. One extremity of layer 32 is fastened to one of the coils 22 as at 32a by a suitable adhesive, while the other extremity is wrapped about the smaller diameter 34 of collar 16 so as to secure the leads 22a of the coils 22 in place. This extremity of layer 32 is fastened as at 32b by a suitable adhesive. If additional reinforcement is necessary, of course layers or a layer can also be disposed on the inner periphery of the cylindrical configuration.

The layers 30 and 32 are maintained in place with respect to each other and the cylindrical configuration and are formed together to provide a unitary structure by means of a bonding agent. In the preferred embodiment, the layer 30 is impregnated with a B-staged resin prior to being disposed on the cylindrical configuration so that with the layers 30 and 32 wrapped in place the entire armature 10 can be placed in an oven to cause homogeneous flow of the resin to and between the coils 22 and the layers 30 and 32 and to further cause curing of the resin. Such flow and curing provides the unitary structure with the desired rigidity and stability when in rotational use and at elevated operating temperatures.

The layer 30 is located on the cylindrical configuration on a bias to the axis of the armature 10 so as to provide resistance to torsional forces which the armature encounters in use under operating temperatures. The layer 32 on the other hand is located transverse to the axis of the armature 10 so as to provide resistance to the centrifugal forces which are encountered in use and under operating temperatures. Thus, the two largest force components, that is, torsional and centrifugal, are overcome by the combination of the layers 30 and 32 to provide a rigid and stable shell motor rotating armature.

I claim:

1. A shell-type motor rotating armature including a plurality of discrete armature coils disposed in a cylindrical configuration, the improvement residing in rigidity and stability enhancing means engaging a periphery of the cylindrical configuration provided by the armature coils comprising: two layers of glass fibers one overlying the other, the first of said layers being disposed on a bias with respect to the axis of the cylindrical configuration and the second of said layers being disposed substantially transverse to the axis of the cylindrical configuration; the armature coils and said layers formed together by a bonding agent so as to provide a unitary structure.

2. The arrangement of claim 1 wherein said layers are located about the outer periphery of the cylindrical configuration.

3. The arrangement of claim 2 wherein the first of said layers is of woven construction and the bias is approximately 45° and wherein the bonding agent is initially in the form of a B-staged resin impregnated in one of said layers.

4. The method of providing rigidity and stability enhancing means for a shell-type motor rotating armature including coils disposed in a cylindrical configuration comprising: wrapping a first layer of glass fibers about a periphery of the cylindrical configuration; wrapping a second layer of glass fibers over said first layer of glass fibers, the wrapping of one of said layers being on a bias with respect to the axis of the cylindrical configuration, the wrapping of the other of said layers being substantially transverse to the axis of the cylindrical configuration; and securing the coils and layers together to form a unitary structure by introducing a bonding agent between the periphery of the cylindrical configuration and between said layers.

5. The arrangement of claim 4 wherein the wrapping of said layers is about the outer periphery of the cylindrical configuration.

6. The arrangement of claim 5 wherein the bias layer is of woven construction, wherein the bias is approximately 45° and wherein the bonding agent initially is a B-stage resin impregnated in one of said layers which is caused by the application of heat to the assembly to form the unitary structure.